United States Patent Office 2,713,576
Patented July 19, 1955

2,713,576

PREPARATION OF AZO COMPOUNDS

Peter L. De Benneville, Philadelphia, Pa., assignor to Rohm & Haas Company, Philadelphia, Pa., a corporation of Delaware No Drawing. Application July 22, 1949,
Serial No. 106,332

3 Claims. (Cl. 260—192)

This invention concerns a method for the preparation of compounds of the formula

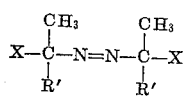

wherein R' is an alkyl group of not over two carbon atoms and X is a nitrile, carboxylate, or carboxylic ester group. The nitrile group is of particular importance.

Compounds of the above structure are shown in Belgian Patent No. 449,032 (issued in March 1943) to be useful blowing agents. By their use sponge rubber, for example, may be formed through the evolution of nitrogen. Azodiisobutyronitrile was used in Germany under the trade name of "Porophor N," which was recognized as a polymerization catalyst, being useful in promoting the polymerization of olefinically unsaturated compounds such as styrene, vinyl esters, acrylic esters, methacrylic esters, and the like, and also in effecting the preparation of copolymers from mixtures of various ethylenically unsaturated compounds.

The azo compounds defined above were available, for example, through the reaction of hydrazine and hydroxy compounds followed by oxidation with hypobromite. Methods of this type were proposed at least as early as 1896 (Thiele and Heuser). It is now found that use of hydrazine, an expensive reagent, is unnecessary and the desired products are obtainable in a satisfactory form by a simple reaction between aliphatic alpha-amino compounds and hypochlorites.

I have found that under alkaline conditions wholly aliphatic amines react with hypochlorites to yield stable azo compounds. The reaction is carried out between about 0° and 15° C. by mixing an alkaline solution of a hypochlorite and an alpha-amino compound of the formula

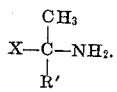

The reaction may be summarized as follows:

M being an equivalent of a metal or an alkyl residue. In some cases the azo compound remains in solution and can be used in this form. Usually, however, the azo compound separates from the reaction mixture as an oil or as a solid and can readily be isolated.

The hypochlorite may be any soluble hypochlorite, an alkali metal hypochlorite, an alkaline earth hypochlorite, or a lower alkyl hypochlorite. There may be used a separately formed hypochlorite or the hypochlorite may be prepared in aqueous solution by running chlorine into a solution of an alkali or alkaline earth hydroxide and this solution used directly. If an alcohol, such as methyl, ethyl, propyl, butyl, or amyl, is present, an alkyl hypochlorite is formed and this is a very effective reagent.

The hypochlorite may be used in an amount which corresponds to a slight excess over that theoretically required for the formation of the azo compound, if the best yields are to be obtained. An excess of 5% to 25% gives good yields, but an excess need not be used. Metal hypochlorites are used in solution at a concentration not exceeding 7%. Solutions as dilute as 1% or less may be used. The best yields are obtained at 3% to 5%. Alkyl hypochlorites permit use of concentrations considerably above 7% on a weight basis and also at higher concentrations on an equivalency basis than is desirable in the case of the metal hypochlorites. This has the advantage of reducing the volume of the reacting solutions and increasing the capacity of a given apparatus.

The alkyl hypochlorites can be prepared as separate and distinct materials or they can be prepared by mixing a hypochlorite solution with a lower alcohol, particularly a tertiary alcohol. Thus, tert.-butyl and tert.-amyl alcohols are particularly useful materials. Furthermore, the alpha-amino compound can be dissolved in an alcohol and this alcoholic solution added to a metal hypochlorite solution with about the same effect as though an alkyl hypochlorite solution was first prepared and the alpha-amino compound added thereto. In any case it is necessary for good results to add the alpha-amino compound to the hypochlorite solution.

The preferred amino compounds are the alpha-amino nitriles, alpha-aminoisobutyronitrile and alpha-amino-alpha-methylbutyronitrile. These are obtainable from acetone and methyl ethyl ketone respectively through formation of the cyanohydrins and reaction of these with ammonia. The nitriles may be hydrolyzed to amides or converted to esters by hydrolysis and esterification with a lower aliphatic monohydric alcohol. Likewise, they may be hydrolyzed to the carboxylic acid or salt thereof in a conventional manner. The carboxylic group in either case will be used in a salt form because of free base in the reaction mixture with hypochlorite.

This invention will be illustrated with the following examples of typical preparations of aliphatic azo compounds.

Example 1

A solution of sodium hypochlorite was prepared by passing 14.2 parts by weight of chlorine into a solution of 20 parts of sodium hydroxide in 200 parts of water cooled with an external ice-salt bath. About half of the resulting solution was taken and placed in a vessel equipped with a dropping funnel and stirrer. It was cooled with an ice bath. Thereto was added dropwise over a thirty-minute period 33.6 parts of alpha-aminoisobutyronitrile. The reaction mixture was then left standing for five hours at 5°–7° C. Crystals formed and were filtered off. These were recrystallized from ethanol. They melted at about 100° C. with decomposition and corresponded in composition to azodiisobutyronitrile. The yield was three parts of the desired product.

In this example alpha-aminoisobutyronitrile was used in a four-fold excess. In the next example it was used in an amount equivalent to the hypochlorite.

Example 2

A solution of 16 parts of sodium hydroxide in 100 parts of water was treated in the cold with 7.1 parts of chlorine. Thereto was added 8.4 parts of alpha-aminoisobutyronitrile dropwise while the reaction mixture was stirred and was held at 0°–5° C. by means of external cooling. The mixture was stored at 5° C. for three hours. Crystals formed and were separated by filtration. In all, 3.8 parts of product was obtained. It melted at 97°–99° C. and corresponded in composition to azodiisobutyronitrile.

See Jacobson, J. Am. Chem. Soc., 68, 2628 (1946) for a method of preparing amino-nitriles.

*Example 3*

A suspension was prepared from 16.8 parts of calcium hydroxide and 10.2 parts of commercial calcium hypochlorite, containing 70% of Ca(OCl)$_2$, in 150 parts of water. Thereto was added 50 parts of ice and then dropwise 8.4 parts of alpha-aminoisobutyronitrile. The temperature of the mixture during the dropwise addition was 5°–10° C. The mixture was stirred for two hours while the temperature was kept between 0° and 5° C. by external cooling. The mixture was extracted with ethyl ether and the extract evaporated to dryness. The residue was dissolved in ethyl alcohol, the alcohol solution was chilled and diluted with water. Solid material was precipitated. It was filtered off and dried. The product contained 34.06% of nitrogen as analyzed by the Dumas method and was alpha,alpha′-azodiisobutyronitrile. It melted at 103°–104.5° C. with decomposition. A sample of the product was heated in water. Gas was evolved. The product resulting was collected and identified as tetramethylsuccinonitrile, melting at 170° C. The theoretical nitrogen content for azodiisobutyronitrile is 34.10%.

*Example 4*

To a mixture of 16.8 parts of calcium hydroxide and 10.5 parts of 70% commercial calcium hypochlorite suspended in 150 parts of distilled water with 50 parts of ice there was added dropwise with good stirring 8.84 parts of alpha-aminoisobutyronitrile over a fifteen-minute period. The mixture was stirred two hours while it was maintained at 5° C. The solid material present was filtered off and extracted with methylal heated to the boiling point. The methylal was filtered while hot and then warmed under reduced pressure. There was thus obtained azodiisobutyronitrile in an amount of 6.9 parts. The product obtained melted at 102°–104° C.

*Example 5*

Chlorine gas was passed into a solution of 16 parts of sodium hydroxide in 100 parts of water and 100 parts of ice at 2°–7° C. until the gain in weight was 9.17 parts. To this solution was added with stirring at 5°–10° C. 8.83 parts of alpha-aminoisobutyronitrile. The mixture was stirred for three hours with the temperature between 5° and 10° C. It was then filtered. The solid obtained was azodiisobutyronitrile in an amount of 7.38 parts.

Other alkaline earth hydroxides and hypochlorites may be used in place of the above calcium compounds but without any particular advantage. In each case the same end-products are obtained.

*Example 6*

Chlorine gas was passed into a solution of 16 parts of sodium hydroxide in 200 parts of water at 5° C. until 8.9 parts of chlorine had been absorbed. Thereto was added in small portions 10.3 parts of alpha-aminoisobutyric acid which has been prepared by the method of Jacobson (J. Am. Chem. Soc., 68, 2628). The reaction mixture was stirred for five hours while it was maintained at 5° C. There was thus obtained a solution of sodium azodiisobutyrate. When this solution was acidified, there was evolved carbon dioxide.

*Example 7*

There was prepared methyl ethyl ketone cyanohydrin and therefrom, following Jacobson's method, there was formed alpha-amino-alpha-methylbutyronitrile as a colorless oil distilling at 67°–68° C./12 mm. There was added 9.8 parts by weight of this material dropwise with stirring to a suspension of 7 parts of lime and 13 parts of 70% commercial calcium hypochlorite in 200 parts of water. The temperature of the reaction mixture was kept between 5° and 10° C. during the twenty minutes needed for the dropwise addition. The mixture was then held at 5° C., stirred for five hours, and filtered. The solid was extracted with hot methylal. The methylal solution was evaporated under low pressure to yield five parts of colorless crystals. These melted at 50°–51° C. and the product decomposed at 90° C. It corresponded in composition to alpha, alpha′-azodi-alpha-methyl-butyronitrile.

*Example 8*

(*a*) A solution of 43.5 parts of alpha-aminoisobutyronitrile, 27.5 parts of anyhdrous ethanol, and 225 parts of chloroform was cooled to 0°–5° C. and saturated with hydrogen chloride. A taffy-like material was formed which solidified on standing overnight at 0° C. A suspension of this material was made in 100 parts of water and to the suspension was added 120 parts of 50% sodium hydroxide solution. A chloroform layer formed and was separated. The aqueous layer was twice extracted with chloroform. The solvent solution was then dried over sodium sulfate and distilled to yield ethyl alpha-aminoisobutyrate. This ester distilled at 65°–72° C./41 mm.

(*b*) A portion of the above ethyl alpha-aminoisobutyrate amounting to 13.1 parts by weight was slowly added with stirring to a mixture made from 40 parts of a 12.5% sodium hydroxide solution and 165 parts of a commercial sodium hypochlorite solution containing 5.25% of sodium hypochlorite. The temperature of the mixture was maintained at 3°–5° C. while the addition was made and for an hour thereafter. Stirring was discontinued. An oil separated and was taken up in ether. The ether solution was dried over sodium sulfate and evaporated under reduced pressure. There was then obtained a pale yellow oil which decomposed at 110° C. Further heating gave a black material which boiled and foamed at 215°–220° C. This temperature corresponds to the boiling point of diethyl alpha,alpha,alpha′,alpha′-tetramethylsuccinate which is formed from the azo compound.

The oil obtained has the structure:

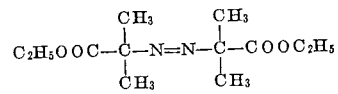

Repetition of the above procedures with substitution of 35.6 parts of isopropyl alcohol for the ethyl alcohol yields an oil, isopropyl alpha-aminoisobutyrate, which on reaction with an alkaline sodium hypochlorite solution as above yields diisopropyl alpha,alpha′-azodiisobutyrate.

Repetition of the above procedures with substitution of 50 parts of alpha-amino-alpha-methylbutyronitrile for the alpha-aminoisobutyronitrile yields ethyl alpha-amino-alpha-methylbutyrate, which on reaction with sodium hypochlorite in dilute solutions yields the diethyl ester of azodi-alpha-methylbutyric acid.

In the same way other esters may be used in the place of the ethyl or isopropyl esters above. Thus, the methyl or propyl ester is similarly prepared and is reacted with a hypochlorite in the same way to give the desired azo compounds

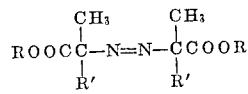

where R is the residue of a saturated monohydric aliphatic alcohol of not over three carbon atoms, ROH, and R′ is a methyl or ethyl group. These evolve nitrogen when heated and form tetraalkylsuccinates.

*Example 9*

To a suspension of 10.9 parts of tert.-butyl hypochlorite in 25 parts of water to which had been added four parts of sodium hydroxide was added slowly with stirring 8.5 parts of alpha-aminoisobutyronitrile. The reaction mixture was kept at 5° C. during the above addition and then left standing at 5° C. for 16 hours. Crystals formed and were separated by filtration. They were identified as azodiisobutyronitrile.

Example 10

A mixture of 9.3 parts of tert.-butyl alcohol, 15 parts of sodium hydroxide, and 100 parts of water was cooled to about 0° C. and 9 parts of chlorine absorbed therein. With the temperature of this mixture held below 10° C., 8.5 parts of alpha-aminoisobutyronitrile was added with stirring. The reaction mixture was allowed to stand for two hours at about 5° C. Crystals which formed during this time were separated by filtration. They amounted to 3.1 parts and were identified as azodiisobutyronitrile.

Example 11

A mixture of 10 parts of tert.-amyl alcohol, 15 parts of sodium hydroxide, and 100 parts of water was treated at 0°–5° C. with 8.5 parts of chlorine. Thereto was added 8.4 parts of alpha-aminoisobutyronitrile. The reaction mixture was allowed to stand for four hours at 0°–10° C. The product which separated was collected by filtration and identified as azodiisobutyronitrile.

Example 12

A sodium hypochlorite solution was prepared by passing 8.9 parts of chlorine into a solution of 15 parts of sodium hydroxide in 100 parts of water at 0°–10° C. A solution of 8.5 parts of alpha-aminoisobutyronitrile in 20 parts of tert.-butyl alcohol was added thereto with stirring while the temperature of the reaction mixture was held below 15° C. The mixture was then left standing overnight at 5° C. The product was collected by filtration and amounted to 7.1 parts of azodiisobutyronitrile.

By the reaction of a dilute alkaline solution of a hypochlorite and a compound of the formula

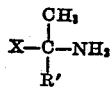

at temperatures not over 15° C. there are formed compounds in which two molecules of such compound become linked through azo nitrogen. The method is simple and direct. It avoids the use of expensive reagents. The products obtained have stability at room temperatures but are decomposed when heated. They are effective blowing agents for preparing foamed rubber and other foamed plastics. They also serve as catalysts for polymerizing unsaturated compounds.

I claim:

1. A method for preparing a compound of the formula

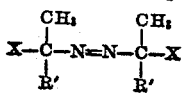

which comprises reacting in dilute alkaline solution a lower alkyl hypochlorite and a compound of the formula

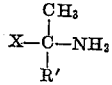

at a temperature between 0° and 15° C., R' in the above formulas representing an alkyl group of not over two carbon atoms and X representing a member of the class consisting of nitrile, alkali and alkaline earth metal carboxylate, and carboxylic ester group, the ester group being formed with a saturated, monohydric, aliphatic alcohol of not over three carbon atoms.

2. A method for preparing a compound of the formula

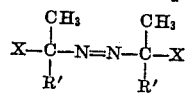

which comprises reacting in dilute alkaline solution t-butyl hypochlorite and a compound of the formula

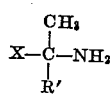

at a temperature between 0° and 15° C., R' in the above formulas representing an alkyl group of not over two carbon atoms and X representing a member of the class consisting of nitrile, alkali and alkaline earth metal carboxylate, and carboxylic ester group, the ester group being formed with a saturated, monohydric, aliphatic alcohol of not over three carbon atoms.

3. A method for preparing a compound of the formula

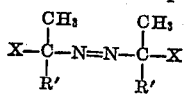

which comprises reacting in dilute alkaline solution t-amyl hypochlorite and a compound of the formula

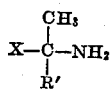

at a temperature between 0° and 15° C., R' in the above formulas representing an alkyl group of not over two carbon atoms and X representing a member of the class consisting of nitrile, alkali and alkaline earth metal carboxylate, and carboxylic ester group, the ester group being formed with a saturated, monohydric, aliphatic alcohol of not over three carbon atoms.

No references cited.